US012684272B2

(12) United States Patent
Kawahara et al.

(10) Patent No.: US 12,684,272 B2
(45) Date of Patent: Jul. 14, 2026

(54) WAVELENGTH CROSS CONNECT DEVICE, AND WAVELENGTH CROSS CONNECT METHOD

(71) Applicant: NTT, Inc., Tokyo (JP)

(72) Inventors: Hiroki Kawahara, Musashino (JP); Masahiro Nakagawa, Musashino (JP); Takeshi Seki, Musashino (JP)

(73) Assignee: NTT, Inc., Tokyo (JP)

( * ) Notice: Subject to any disclaimer, the term of this patent is extended or adjusted under 35 U.S.C. 154(b) by 280 days.

(21) Appl. No.: 18/567,502

(22) PCT Filed: Jun. 7, 2021

(86) PCT No.: PCT/JP2021/021584
§ 371 (c)(1),
(2) Date: Dec. 6, 2023

(87) PCT Pub. No.: WO2022/259318
PCT Pub. Date: Dec. 15, 2022

(65) Prior Publication Data
US 2024/0373152 A1 Nov. 7, 2024

(51) Int. Cl.
*H04Q 11/00* (2006.01)
*H04J 14/02* (2006.01)

(52) U.S. Cl.
CPC ...... *H04Q 11/0005* (2013.01); *H04J 14/0305* (2023.08); *H04Q 2011/0011* (2013.01);
(Continued)

(58) Field of Classification Search
CPC ................................................ H04Q 11/0005
See application file for complete search history.

(56) References Cited

U.S. PATENT DOCUMENTS

2015/0256908 A1* 9/2015 Zhu .......................... H04L 45/62
398/85

FOREIGN PATENT DOCUMENTS

EP 2773057 2/2013

OTHER PUBLICATIONS

Napoli et al., "Perspectives of multi-band optical communication systems," The 23rd OptoElectronics and Communications Conference (OECC 2018) Technical Digest, Jeju, Korea, Jul. 2-6, 2018, 2 pages.

* cited by examiner

*Primary Examiner* — Shi K Li
(74) *Attorney, Agent, or Firm* — Fish & Richardson P.C.

(57) ABSTRACT

A wavelength cross connect device includes: a WXC unit including input-side WSSes and Output-side WSSes; and a wavelength band switching unit. Of wavelength multiplexed signal beams N-split by each input-side WSS, wavelength multiplexed signal beams in which optical signals for which wavelength band conversion is not necessary are multiplexed are input to the output-side WSSes. The wavelength band switching unit performs wavelength band conversion on, of the N-split wavelength multiplexed signal beams, a selected wavelength multiplexed signal beam in which optical signals for which wavelength band conversion is necessary are multiplexed, to generate a wavelength-band-converted wavelength multiplexed signal beam in which the wavelength bands of optical signals of distinct wavelength bands multiplexed in the wavelength multiplexed signal beam have been converted, and outputs the wavelength-band-converted wavelength multiplexed signal beam to one of the output-side WSSes so as to be rerouted.

5 Claims, 11 Drawing Sheets

(52) U.S. Cl.
CPC ............... *H04Q 2011/0016* (2013.01); *H04Q 2011/006* (2013.01)

FIG. 3

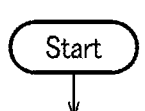

Start

| | |
|---|---|
| S-, C-, and L-band wavelength multiplexed signal beams of respective input routes are input to input-side WSSes. | S1 |

| | |
|---|---|
| Input-side WSSes each split respective wavelength multiplexed signal beam to output optical signals for which wavelength band conversion is not necessary to output-side WSSes and output optical signals for which wavelength band conversion is necessary to wavelength band switching units. | S2 |

| | |
|---|---|
| ⟨M × 1⟩ WSS of wavelength band switching unit sequentially performs selection on wavelength multiplexed signal beams to output selected wavelength multiplexed signal beam to wavelength band switch processing unit. | S3 |

| | |
|---|---|
| Wavelength band switch processing unit demultiplexes wavelength multiplexed signal beam to output S-, C-, and L-band optical signals. | S4 |

| | |
|---|---|
| Next, convert S-band optical signal to C-band optical signal; convert L-band optical signal to C-band optical signal; and apply no conversion to C-band optical signal, to be output to ⟨K × K⟩ WSS having same number (K=3) of input and output ports. | S5 |

| | |
|---|---|
| ⟨K × K⟩ WSS outputs K (=3) C-band optical signals from K output ports necessary for wavelength band conversion. | S6 |

| | |
|---|---|
| Three C-band optical signals are processed resulting in converted S- and L-band optical signals and one output optical signal with no conversion. | S7 |

| | |
|---|---|
| Output wavelength multiplexed signal beam in which S-, C-, and L-band optical signals are combined to input port of ⟨1 × M⟩ WSS. | S8 |

| | |
|---|---|
| ⟨1 × M⟩ WSS outputs wavelength multiplexed signal beam to predetermined one of N input ports of output-side WSS so as to be rerouted. | S9 |

| | |
|---|---|
| Output-side WSSes each sequentially perform selection on wavelength multiplexed signal beams input from N input ports and output selected wavelength multiplexed signal to predetermined output route. | S10 |

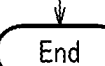

End

FIG. 4

| THREE-SEGMENT PATH | FIRST SEGMENT | SECOND SEGMENT | THIRD SEGMENT |
|---|---|---|---|
| PATH 1 | S | C | L |
| PATH 2 | C | L | S |
| PATH 3 | L | S | C |

WAVELENGTH CROSS CONNECT DEVICE, AND WAVELENGTH CROSS CONNECT METHOD

CROSS-REFERENCE TO RELATED APPLICATIONS

This is a National Stage Application of PCT Application No. PCT/JP2021/021584, filed on Jun. 7, 2021. The disclosure of the prior application is considered part of the disclosure of this application, and is incorporated in its entirety into this application.

TECHNICAL FIELD

The present invention relates to a wavelength cross connect device and a wavelength cross connect method to be used in multi-band transmission for transmitting wavelength multiplexed signal beams in each of which optical signals in distinct wavelength bands are multiplexed through optical fibers.

BACKGROUND

A wavelength cross connect device used in a multi-band transmission system is an optical node that connects desired routes in an optical network in optical transmission lines that are formed with one or a plurality of optical fibers or multicore fibers that transmit wavelength multiplexed signal beams in which optical signals in distinct wavelength bands are multiplexed. In this wavelength cross connect device, a wavelength multiplexed signal beam transmitted from a route on the input side is output to desired routes on the output side via a plurality of wavelength selective switches (WSSes).

Conventional wavelength cross connect devices first demultiplex, in each of input-side M routes, optical signals of respective wavelength bands of a wavelength multiplexed signal beam transmitted in multiple bands. For example, optical signals of respective wavelength bands of S, C, and L bands multiplexed in the wavelength multiplexed signal beam are demultiplexed.

Here, the respective wavelength bands are S band of 1460 nm to 1530 nm, C band of 1530 nm to 1565 nm, and L band of 1565 nm to 1625 nm, in ascending order from the short-wavelength side. The S-, C-, and L-band optical signals are respectively allocated to S, C, and L bands of the optical fibers as the routes at the time of transmission.

The respective demultiplexed optical signals of S, C, and L bands (the respective wavelength bands) are input to wavelength cross connect (WXC) units respectively provided for the wavelength bands. In each WXC, a WSS provided for the corresponding wavelength band on the input side of the WXC performs processing such as attenuation amount adjustment on the optical signal of the corresponding wavelength band. The resultant optical signals are input to output-side WSSes provided for respective wavelength bands and mesh-connected to the input-side WSSes. The input S-, C-, and L-band optical signals are combined by the WSSes on the output side, and the wavelength multiplexed signal beams obtained by this combining are transmitted in multiple bands toward M routes on the output side.

Non-Patent Literature 1 discloses a conventional technique relating to this kind of wavelength cross connect device.

CITATION LIST

Non-Patent Literature

Non-Patent Literature 1: A. Napoli, et al., "Perspectives of multi-band optical communication systems", Proc. OECC 2018, paper 5B3-1, July 2018.

SUMMARY OF THE INVENTION

Technical Problem

In the conventional wavelength cross connect device described above, however, there are differences in the optical characteristics due to the differences among the wavelength bands in the configurations of the S-, C-, and L-band WXC units. As a result, variations in transmission performance occur among S-, C-, and L-band optical signals. For example, wavelength band dependency appears in the transmission band and the optical loss, which are specification items of a WSS and an optical amplifier, and this wavelength band dependency causes variations in the optical signal transmission performance among S, C, and L bands. The variations lower the efficiency of utilizing each wavelength band in the optical network.

The present invention has been made in view of such circumstances, and aims to reduce differences in transmission performance among optical signals of distinct wavelength bands within an optical network, thereby enhancing the efficiency of utilizing each wavelength band within the optical network.

Solution to Problem

To solve the above problem, the present invention provides a wavelength cross connect device configured to: split each of wavelength multiplexed signal beams, in each of which optical signals of distinct wavelength bands are multiplexed and each of which is transmitted in multiple bands in a respective one of M optical transmission lines each including one or a plurality of optical fibers, each into N wavelength multiplexed signal beams using M input-side Wavelength Selective Switches (WSSes), where N is a number larger than M; and perform relay processing by which the N-split wavelength multiplexed signal beams are rerouted and output via M output-side WSSes mesh-connected to the input-side WSS, the wavelength cross connect device including: a wavelength cross connect (WXC) unit including the input-side WSSes and the output-side WSSes, wherein, of the wavelength multiplexed signal beams N-split by each of the input-side WSSes, wavelength multiplexed signal beams in which optical signals for which wavelength band conversion is not necessary are multiplexed are input to the output-side WSSes; and a wavelength band switching unit configured to convert, from the wavelength multiplexed signal beams N-split by each of the input-side WSSes, wavelength bands of a wavelength multiplexed signal beam in which optical signals for which wavelength band conversion is necessary are multiplexed to different wavelength bands, reroute the converted wavelength multiplexed signal beam, and output the rerouted wavelength multiplexed signal beam to the output-side WSSes.

Advantageous Effects of Invention

The present invention enables the reduction of differences in transmission performance among optical signals of distinct wavelength bands within an optical network, thereby enhancing the efficiency of utilizing each wavelength band within the optical network.

BRIEF DESCRIPTION OF DRAWINGS

FIG. 3 is a flowchart for explaining a wavelength cross connect operation performed by the wavelength cross connect device according to the embodiment.

FIG. 4 is a block diagram illustrating the configuration of a multi-band transmission system formed by connecting nodes each including the wavelength cross connect device of the embodiment in a ring-like structure with optical transmission lines.

DESCRIPTION OF EMBODIMENTS

Figure 1:
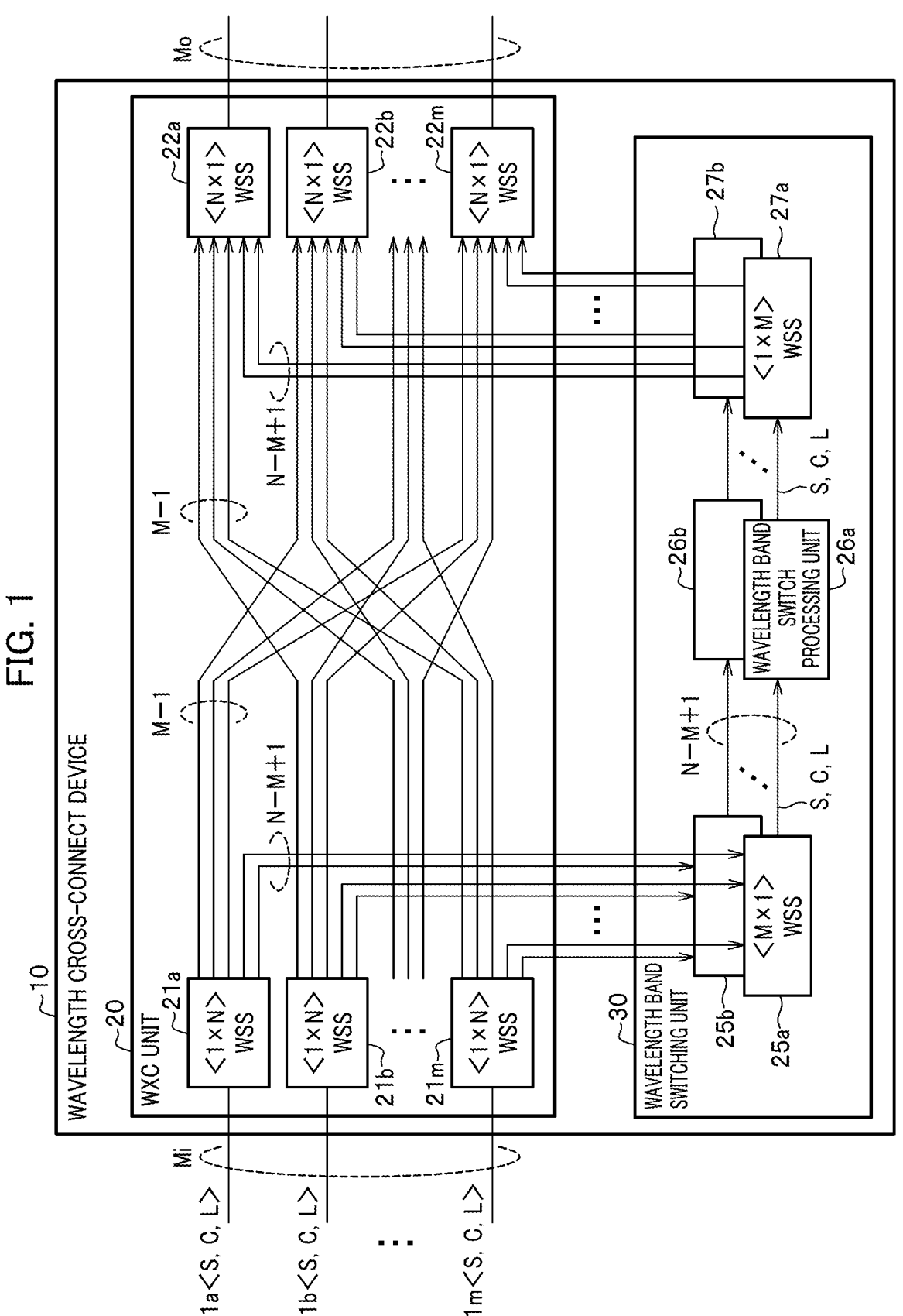
FIG. 1 is a block diagram illustrating the configuration of a wavelength cross connect device that is used in a multi-band transmission system according to an embodiment of the present invention.

Hereinbelow; a description will be given of an embodiment of the present invention with reference to the drawings. Note that, in all the drawings in this specification, components having corresponding functions are denoted by the same reference numerals, and explanation of them will not be repeated as appropriate.

Configuration of Embodiment

FIG. 1 is a block diagram illustrating the configuration of a wavelength cross connect device that is used in a multi-band transmission system according to an embodiment of the present invention.

Wavelength cross connect device 10 illustrated in FIG. 1 includes WXC unit 20 and wavelength band switching unit 30.

WXC unit 20 includes M<1×N> wavelength selective switches (WSSes) 21a, 21b . . . , and 21m which are respectively connected to M input routes each including one or a plurality of optical fibers and to which wavelength multiplexed signal beams 1a, 1b . . . , and 1m transmitted in multiple bands in the M input routes respectively are respectively input. Further, WXC unit 20 also includes M<N×1> WSSes 22a, 22b . . . , and 22m on the output-side, full-mesh connected (described later) to the M<1×N> WSSes 21a to 21m on the input side. Note that <1×N> WSSes 21a to 21m on the input side are also referred to as input-side WSSes 21a to 21m, and <N×1> WSSes 22a to 22m on the output side are also referred to as output-side WSSes 22a to 22m.

WXC unit 20 outputs, of the optical signals of distinct wavelength bands multiplexed in wavelength multiplexed signal beam 1a, 1b . . . , and 1m that have been transmitted in multiple bands respectively through the M input routes formed by optical fibers denoted by Mi, optical signals for which wavelength band conversion is necessary to wavelength band switching unit 30 and optical signals for which wavelength band conversion is not necessary to output-side WSSes 22a to 22m so as to be rerouted.

Note that, it is assumed that, in WXC unit 20, wavelength multiplexed signal beams 1a to 1m transmitted in multiple bands through the input routes respectively each include multiplexed S-, C-, and L-band optical signals as indicated by "1a<S, C, L>", "1b<S, C, L>", and "1m<S, C, L>" in FIG. 1. Here, N and M have a magnitude relationship of M>N, an example of which is N=5 and M=4. The output ports of output-side <N×1> WSSes 22a to 22m are connected to M output routes, denoted by reference sign Mo, and output the wavelength multiplexed signal beams. Note that input-side <1×N> WSSes 21a to 21m may be 1×N optical couplers such as optical fiber couplers.

Input-side WSSes 21a to 21m are referred to as the first input-side WSS 21a, the second input-side WSS 21b, and the M-th input-side WSS 21m in order from the top in the drawing. Output-side WSSes 22a to 22m are also referred to as the first output-side WSS 22a, the second output-side WSS 22b, and the M-th output-side WSS 22m in order from the top.

The full-mesh connection is as follows. That is, in input-side WSSes 21a to 21m, of the N number of output ports (N output ports) of the first WSS 21a, (M−1)=4−1=3 output ports are connected to the N input ports of the second to M-th output-side WSSes 22b to 22m excluding the first output-side WSS. In this manner, the (M−1)=3 output ports of each of input-side WSSes 21a to 21m are connected to the (M−1)=3 input ports among the N input ports of each of output-side WSSes 22a to 22m other than the output-side WSS located on the same number route as the input-side WSS. This connection configures paths through which optical signals for which wavelength band conversion is not necessary are transmitted for rerouting.

The (N−M+1)=5−4+1=2 output ports other than the (M−1)=3 output ports of the first WSS 21a on the input side are connected to wavelength band switching unit 30. The other second to M-th input-side WSSes 21b to 21m are connected in a similar manner.

The (N−M+1)=2 input ports other than the (M−1)=3 input ports of the first WSS 22a on the output side are connected to wavelength band switching unit 30. The other second to M-th output-side WSSes 22b to 22m are connected in a similar manner. With the (N−M+1) connections, the above-described optical signals for which wavelength band conversion is necessary are transmitted to wavelength band switching unit 30.

Input-side WSSes 21*a* to 21*m* have the same function, and each have a function of N-splitting each of multi-band (S-, C-, and L-wavelength band) wavelength multiplexed signal beams 1*a* to 1*m*. Note that the WSS has a function of performing the N-splitting by means of outputting each optical signal of the wavelength multiplexed signal beam input from the input port from a desired output port, rather than simple N-splitting using a coupler or the like. Taking the first input-side WSS 21*a* as a representative, WSS 21*a* splits wavelength multiplexed signal beam 1*a* input from one input port, and outputs the split wavelength multiplexed signal beams 1*a* from the N output ports.

Output-side WSSes 22*a* to 22*m* have the same functions, and have a function of sequentially performing selection on multi-band wavelength multiplexed signal beams. Taking the first output-side WSS 22*a* as a representative, WSS 22*a* sequentially performs selection on the wavelength multiplexed signal beams input from the N input ports, and outputs the selected wavelength multiplexed signal beam to one output route from the one output port.

Next, wavelength band switching unit 30 converts optical signals of distinct wavelength bands multiplexed in (N−M+1) wavelength multiplexed signal beams from input-side WSSes 21*a* to 21*m* into optical signals of predetermined wavelength bands, reroutes the converted optical signals, and outputs the rerouted optical signals to output-side WSSes 22*a* to 22*m*.

Wavelength band switching unit 30 includes <M×1> WSSes 25*a* and 25*b* on the input side, wavelength band switch processing units 26*a* and 26*b*, and <1×M> WSSes 27*a* and 27*b* on the output side. <M×1> WSSes 25*a* and 25*b* on the input side have M M input ports and one output port. <1×M> WSSes 27*a* and 27*b* on the output side have one input port and M output ports.

Here, <M×1> WSSes 25*a* and 25*b* on the input side may be optical couplers such as M×1 optical fiber couplers. <1×M> WSSes 27*a* and 27*b* on the output side may be 1×M optical couplers. <M×1> WSSes 25*a* and 25*b* form the first WSS described in the claims. <1×M> WSSes 27*a* and 27*b* form the second WSS described in the claims.

Input-side WSS 25*a*, wavelength band switch processing unit 26*a*, and output-side WSS 27*a* form a constituent set. This constituent set is provided as many as the (N−M+1)=2 output ports of input-side WSS 21*a* of WXC unit 20. In this example, a first constituent set and a second constituent set are provided.

In the first constituent set, one of each (N−M+1)=2 output ports of input-side WSSes 21*a* to 21*m* of WXC unit 20 is connected to the M input ports of input-side <M×1> WSS 25*a*. The output port of <M×1> WSS 25*a* is connected to the input port of wavelength band switch processing unit 26*a*. The output port of wavelength band switch processing unit 26*a* is connected to the input port of output-side <1×M> WSS 27*a*.

<1×M> WSS 27*a* performs rerouting of the optical signals of the wavelength bands converted by wavelength band switch processing unit 26*a*, which determines which one of the M output routes the optical signals are to be output. The M output ports of <1×M> WSS 27*a* are each connected to one of (N−M+1)=2 input ports of each of output-side WSSes 22*a* to 22*m* of WXC unit 20. The second constituent set is also connected in a similar manner as the first constituent set.

Configuration of Wavelength Band Switch Processing Unit

Figure 2:
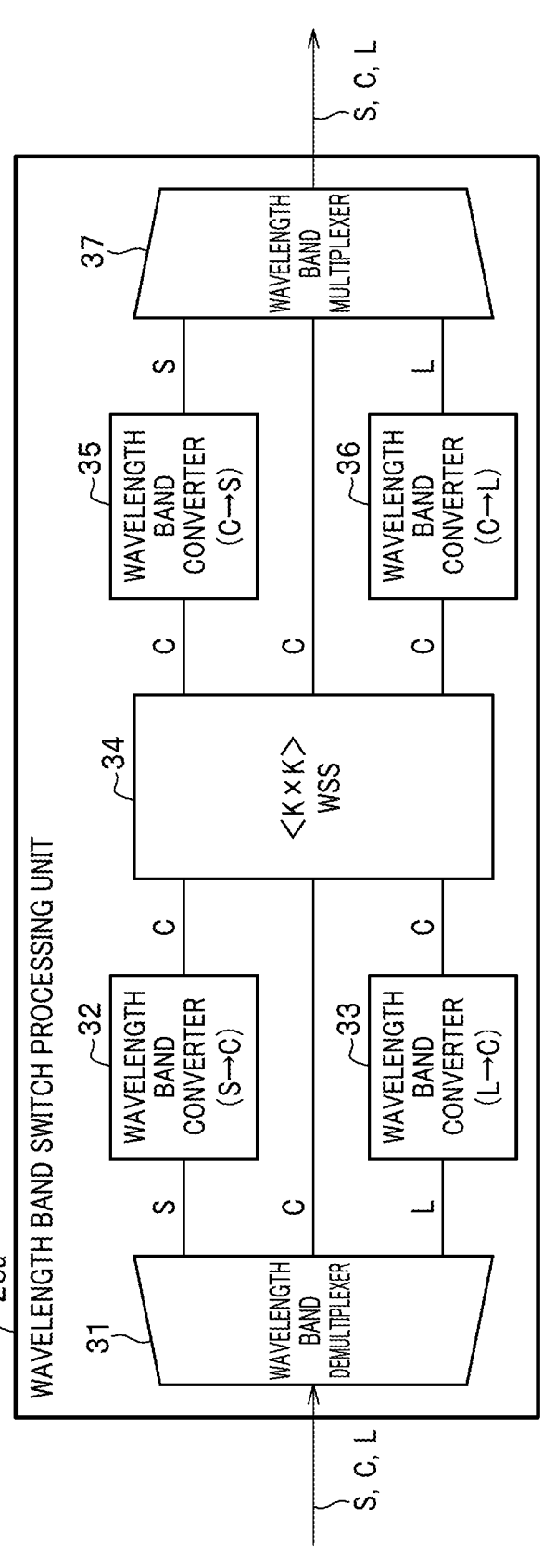
FIG. 2 is a block diagram illustrating the configuration of a wavelength band switch processing unit of the wavelength cross connect device according to the embodiment.

Each of wavelength band switch processing units 26*a* and 26*b* includes, as illustrated in FIG. 2 in which wavelength band switch processing unit 26*a* is depicted as a representative, wavelength band demultiplexer 31, a plurality of input-side wavelength band converters 32 and 33, <K×K> WSS 34, a plurality of output-side wavelength band converters 35 and 36, and wavelength band multiplexer 37.

K is the number of wavelength bands, and K=3, because of S, C, and L bands in this example. Note that <K×K> WSS 34 forms the specific WSS described in the claims. Wavelength band converters 32 and 33 on the input side form the input-side converters described in the claims. Wavelength band converters 35 and 36 on the output side form the output-side converters described in the claims.

Wavelength band demultiplexer 31 demultiplexes an S-, C-, and L-band wavelength multiplexed signal beam input from input-side <M×1> WSS 25*a* (FIG. 1) and outputs the demultiplexed S-, C-, and L-band optical signals. Here, C band is the one wavelength band (specific wavelength band) processable by <K×K> WSS 34. <K×K> WSS 34 is configured to be capable of processing only optical signals in the specific wavelength band (C band). Accordingly, the demultiplexed C-band optical signal is input directly to <K×K> WSS 34.

Wavelength band converter 32 on the input side of <K×K> WSS 34 converts the S-band optical signal into a C-band optical signal, and outputs the converted C-band optical signal to <K×K> WSS 34. Wavelength band converter 33 converts the L-band optical signal into a C-band optical signal, and outputs the converted C-band optical signal to <K×K> WSS 34.

Wavelength band converter 35 on the output side converts a C-band optical signal into an S-band optical signal, and outputs the converted S-band optical signal to wavelength band multiplexer 37. Wavelength band converter 36 converts the C-band optical signal into an L-band optical signal, and outputs the converted L-band optical signal to wavelength band multiplexer 37.

<K×K> WSS 34 plays a role of switching the wavelength bands of the optical signals multiplexed in wavelength multiplexed signal beams 1*a* to 1*m* input from the optical transmission line Mi on the input side of wavelength cross connect device 10 (FIG. 1) to wavelength bands for transmitting to optical transmission lines Mo on the output side (FIG. 1).

<K×K> WSS 34 has the same number of input ports and the same number of output ports as the number (K=3) of the wavelength bands multiplexed in the wavelength multiplexed signal beam. In <K×K> WSS 34, the C-band optical signals input from the K (=3) input ports are output from the K (=3) output ports connected to: wavelength band converters 35 and 36, which perform conversion into a predetermined wavelength band; and wavelength band multiplexer 37.

For example, the C-band optical signal input from the second input port of <K×K> WSS 34 is input, from the first output port, to wavelength band converter 35, where the optical signal is converted into an S-band optical signal. This example is conversion processing for converting the input C-band optical signal into an S-band optical signal and transmitting the S-band optical signal to optical transmission lines Mo (FIG. 1) on the output side.

Wavelength band multiplexer 37 combines the S-, C-, and L-band optical signals to convert them into a wavelength multiplexed signal beam, and outputs the converted wavelength multiplexed signal beam to output-side <1×M> WSS 27*a* illustrated in FIG. 1.

<1×M> WSSes 27a and 27b output the wavelength multiplexed signal beams to the (N−M+1)=2 input ports of each of output-side WSSes 22a to 22m.

Each of output-side WSSes 22a to 22m sequentially performs selection on the respective S-, C-, and L-band wavelength multiplexed signal beams input from the N input port and outputs the selected S-, C-, and L-band wavelength multiplexed signal beam from the output port to the M output routes, thereby to reroute the wavelength multiplexed signal beam.

Operation of Embodiment

Next, the wavelength cross connect operation performed by wavelength cross connect device 10 according to the embodiment is described with reference to the flowchart shown in FIG. 3.

In step S1 shown in FIG. 3, wavelength multiplexed signal beams 1a to 1m transmitted in multiple bands in the respective M input routes illustrated in FIG. 1 are input to the input ports of M input-side WSSes 21a to 21m of WXC unit 20. Note that each of wavelength multiplexed signal beams 1a to 1m includes multiplexed S-, C-, and L-band optical signals.

In step S2, each of input-side WSSes 21a to 21m splits a respective one of wavelength multiplexed signal beam 1a to 1m, and outputs, of the split wavelength multiplexed signal beams, optical signals for which wavelength band conversion is not necessary to the N input ports of the predetermined output-side WSSes 22a to 22m. In addition, each of input-side WSSes 21a to 21m outputs optical signals for which wavelength band conversion is necessary to the M input ports of <M×1> WSSes 25a and 25b of wavelength band switching unit 30.

In step S3, <M×1> WSSes 25a and 25b sequentially perform selection on the M wavelength multiplexed signal beams in which S, C, and L bands are multiplexed, and output the selected wavelength multiplexed signal beam to wavelength band switch processing units 26a and 26b.

In step S4, in each of wavelength band switch processing units 26a and 26b, wavelength band demultiplexer 31 illustrated in FIG. 2 demultiplexes the input S-, C-, and L-band wavelength multiplexed signal beam and outputs the demultiplexed S-, C-, and L-band optical signals. In this step, the C-band optical signal is input as is to <K×K> WSS 34. The S-band optical signal is output to wavelength band converter 32; and the L-band optical signal is output to wavelength band converter 33.

In step S5, wavelength band converter 32 converts the S-band optical signal into a C-band optical signal, and outputs the converted C-band optical signal to <K×K> WSS 34. Wavelength band converter 33 converts the L-band optical signal into a C-band optical signal, and outputs the converted C-band optical signal to <K×K> WSS 34. The C-band optical signal demultiplexed by wavelength band demultiplexer 31 is output to <K×K> WSS 34 without conversion.

In step S6, <K×K> WSS 34 outputs the C-band optical signals input from the K (=3) input ports from the K output ports necessary for wavelength band conversion. For example, the C-band optical signal input from the second input port of <K×K> WSS 34 is output from the first output port to wavelength band converter 35.

In step S7, wavelength band converter 35 converts the C-band optical signal into an S-band optical signal, and outputs the converted S-band optical signal to wavelength band multiplexer 37. Wavelength band converter 36 converts the C-band optical signal into an L-band optical signal, and outputs the converted L-band optical signal to wavelength band multiplexer 37. The C-band optical signal output from <K×K> WSS 34 other than described above is output to wavelength band multiplexer 37 without conversion.

In step S8, wavelength band multiplexer 37 outputs a wavelength multiplexed signal beam in which the S-, C-, and L-band optical signals are combined to the input port of a corresponding one of <1×M> WSSes 27a and 27b illustrated in FIG. 1.

In step S9, <1×M> WSSes 27a and 27b output the wavelength multiplexed signal beams to (N−M+1)=2 input ports (predetermined input ports) among the N input ports of output-side WSSes 22a to 22m of WXC unit 20 so as to be rerouted.

In step S10, each of output-side WSSes 22a to 22m sequentially perform selection on the S-, C-, and L-band wavelength multiplexed signal beams input from the N input port, and outputs the selected wavelength multiplexed signal beam from the output port to the M output routes.

Effects of Embodiment

Effects of wavelength cross connect device 10 according to the embodiment of the present invention are now described.

Wavelength cross connect device 10 splits wavelength multiplexed signal beams 1a to 1m, in each of which optical signals of distinct wavelength bands (S, C, and L bands) are multiplexed and each of which is transmitted in multiple bands in a respective one of the M optical transmission lines each including one or a plurality of optical fibers, each into N wavelength multiplexed signal beams using input-side WSSes 21a to 21m, where N is a number larger than M. Further, wavelength cross connect device 10 performs relay processing by which the N-split wavelength multiplexed signal beams are rerouted using output-side WSSes 22a to 22m mesh-connected to input-side WSSes 21a to 21m and output to the output-side routes.

(1a) Wavelength cross connect device 10 includes WXC unit 20 and wavelength band switching unit 30. WXC unit 20 includes input-side WSSes 21a to 21m and output-side WSSes 22a to 22m. Of the wavelength multiplexed signal beams N-split by input-side WSSes 21a to 21m, wavelength multiplexed signal beams in which optical signals for which wavelength band conversion is not necessary are multiplexed are input to output-side WSSes 22a to 22m.

Wavelength band switching unit 30 is configured to: convert, from wavelength multiplexed signal beams N-split by each of input-side WSSes 21a to 21m, wavelength bands of wavelength multiplexed signal beams in which optical signals for which wavelength band conversion is necessary are multiplexed to different wavelength bands; reroute the converted wavelength multiplexed signal beams; and output the rerouted wavelength multiplexed signal beams to output-side WSSes 22a to 22m.

According to this configuration, wavelength cross connect device 10 N-splits wavelength multiplexed signal beams 1a to 1m, in which optical signals of distinct wavelength bands are multiplexed and which are transmitted in multiple bands, with input-side WSSes 21a to 21m of WXC unit 20. From the N-split wavelength multiplexed signal beams, by wavelength band switching unit 30, wavelength bands of wavelength multiplexed signal beams in which optical signals for which wavelength band conversion is necessary are multiplexed can be converted into different wavelength bands, rerouted, and output to output-side transmission routes Mo via output-side WSSes 22a to 22m.

Accordingly, in multi-band transmission system 40 (FIG. 4), in which a plurality of nodes to which wavelength cross connect device 10 is applied are linked to one another, wavelength band conversion can be performed on a link basis and on a wavelength basis as described later. By this conversion, a wavelength (wavelength C1 of C band, for example) of a vacant wavelength band of an optical transmission line between nodes 40a and 40b can be used by the conversion by wavelength cross connect device 10 located on the forward side of the segment between nodes 40a and 40b. In this manner, as a wavelength of a wavelength band of a wavelength-unused segment can be made usable, the use capacity of the network can be increased. That is, the efficiency of utilizing the network in the multi-band transmission system can be increased.

Figure 4:
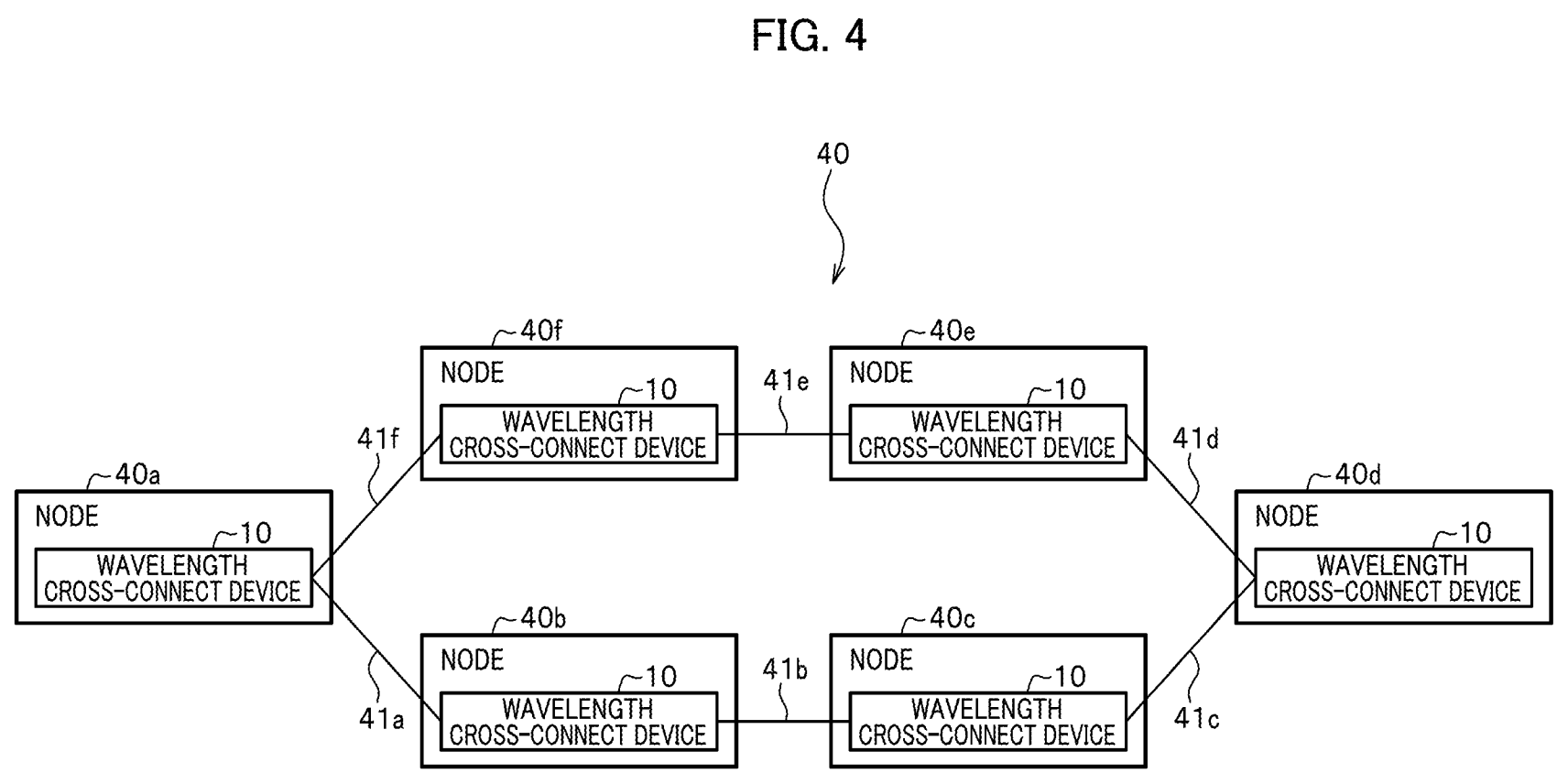

Multi-band transmission system (also referred to as system) 40 illustrated in FIG. 4 includes nodes 40a, 40b, 40c, 40d, 40e, and 40f, each of which serves as a communication device including a wavelength cross connect device 10 and which are connected in a ring-like structure with optical transmission lines 41a, 41b, 41c, 41d, 41e, and 41f formed of optical fibers.

The link in the above-mentioned "on a link basis" is the unit of optical transmission line 41a that connects the segment between two adjacent nodes (nodes 40a and 40b, for example) in the system 40. In other words, it is a unit of a segment between two adjacent nodes.

According to the conventional technique, for example, in a case where optical signals of distinct wavelength bands are transmitted through a plurality of paths using multi-band transmission in nodes 40a-40b-40c-40d via optical transmission lines 41a, 41b, and 41c, with node 40a being the start point and node 40d being the end point, the transmission in one path is limited to transmission in one wavelength band. Note that "in nodes 40a-40b-40c-40d" is also stated as "in nodes 40a . . . 40d".

For example, in a case where S-, C-, and L-band optical signals are transmitted in multiple bands in nodes 40a . . . 40d, a path 1 passing through optical transmission lines 41a to 41c is limited to transmission of an S-band optical signal, a path 2 is limited to transmission of a C-band optical signal, and path 3 is limited to transmission of an L-band optical signal.

Here, the multi-band transmission has a characteristic in that power is transferred from an optical signal having a short wavelength to an optical signal having a long wavelength. For this reason, in many cases in the above example, the transmission performance of transmitting the S-band optical signal in path 1 is poor, the transmission performance of transmitting the C-band optical signal in path 2 is normal, and the transmission performance of transmitting the L-band optical signal in path 3 is high. In this manner, variations in the transmission performance occur among paths 1, 2, and 3.

The transmission performance also depends on parameters of a device (optical product) such as an optical fiber, such as a transmission band and a loss amount as the performance thereof, and on stimulated Raman scattering (SRS), which is a nonlinear optical effect. The above parameters have strong band dependencies. As the transmission performance depends on the wavelength band in use as described above, variations occur among distinct wavelength bands.

In contrast, the embodiment is able to change the wavelength bands for each one segment (on a link basis) in nodes 40a . . . 40d by wavelength cross connect device 10.

Figures 5, 6:
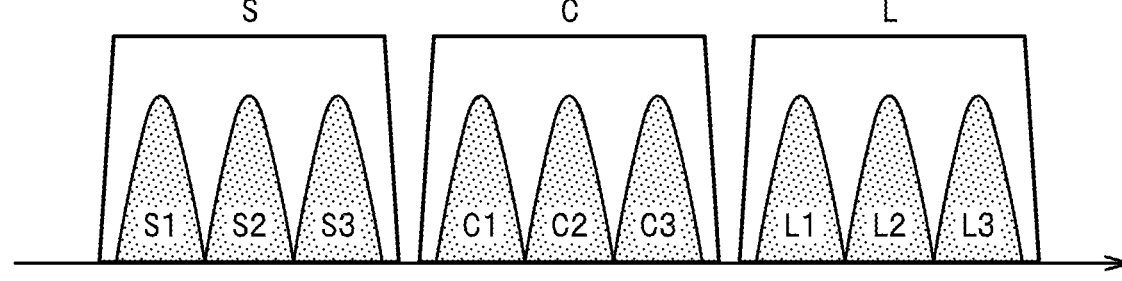
FIG. 5 is a diagram illustrating a table of distinct wavelength bands to be transmitted in the respective paths between the nodes in the multi-band transmission system illustrated in FIG. 4.
FIG. 6 is a diagram illustrating the wavelengths in S, C, and L bands as distinct wavelength bands.

For example, as illustrated in FIG. 5, in path 1 through nodes 40a-40b-40c-40d, the first segment (between nodes 40a and 40b) is caused to transmit an S-band optical signal, and the second segment (between nodes 40b and 40c) is caused to transmit a C-band optical signal. The third segment (between nodes 40c and 40d) is caused to transmit an L-band optical signal. In path 2, the first segment is caused to transmit a C-band optical signal, the second segment is caused to transmit an L-band optical signal, and the third segment is caused to transmit an S-band optical signal. In path 3, the first segment is caused to transmit an L-band optical signal, the second segment is caused to transmit an S-band optical signal, and the third segment is caused to transmit a C-band optical signal.

When optical signals of different wavelength bands are transmitted in paths 1, 2, and 3 in the segments as described above, the transmission performances of the distinct wavelength bands in the respective paths 1, 2, and 3 in the segments are averaged. This averaging reduces the variations in transmission performance among paths 1 to 3. As the variations are reduced, the efficiency of utilizing the network in the multi-band transmission system is increased.

Next, a description will be given of the effect of being able to perform wavelength band conversion on a wavelength basis. Assume that, as illustrated in FIG. 6, S band of an optical signal includes wavelengths S1, S2, and S3, C band includes wavelengths C1, C2, and C3, and L band includes wavelengths L1, L2, and L3.

In the conventional technique, one path set in all the segments is limited to one wavelength band. In this embodiment, however, wavelength cross connect device 10 can set any wavelength in the distinct wavelength bands for each of paths 1, 2, and 3 in each of the segments in 40a-40b-40c-40d nodes. For example, wavelength S1 of S band can be set in path 1 of optical transmission line 41a in the segment between nodes 40a and 40b, wavelength C1 of C band can be set in path 2 of optical transmission line 41b in the segment between nodes 40b and 40c, wavelength L1 of L band can be set in path 3 of optical transmission line 41c in the segment between nodes 40c and 40d, and an optical signal can be transmitted at set wavelengths S1, C1, and L1.

In the case of this embodiment being able to perform wavelength band conversion on a wavelength basis in this manner, it is possible to avoid the constraint on wavelength continuity of the conventional technique. The wavelength continuity constraint means the necessity of continuous transmission at the same wavelength in one wavelength band in one path in nodes 40a . . . 40d.

Figure 7:
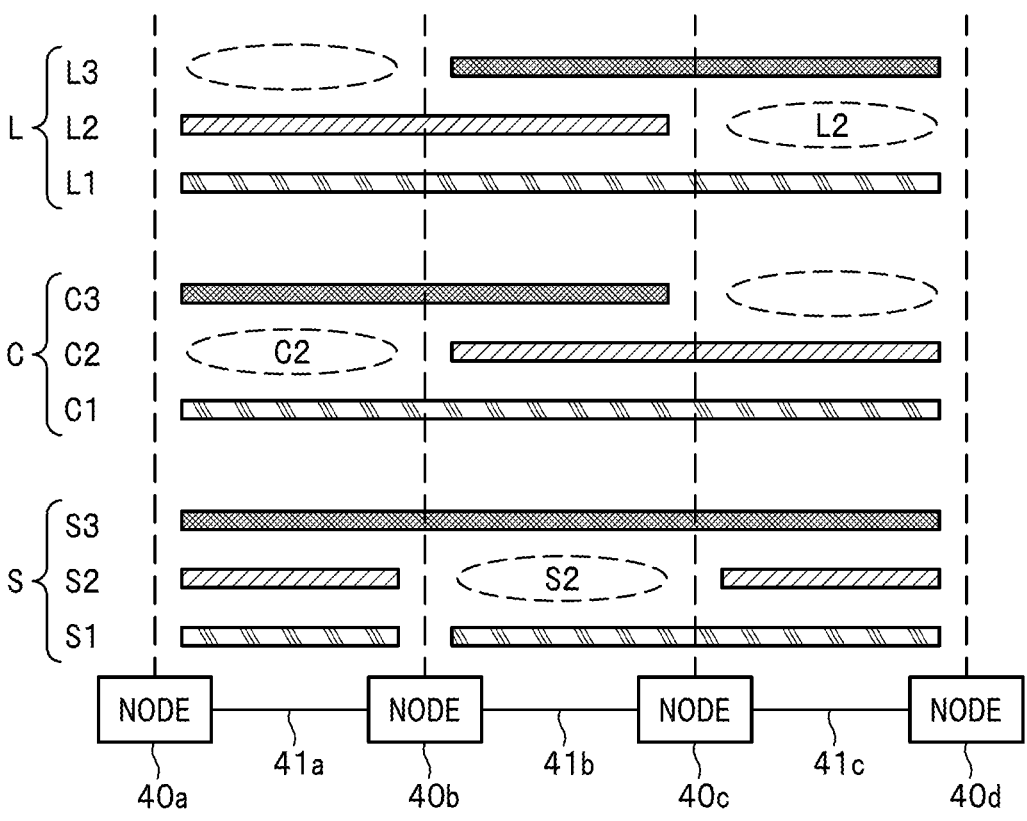
FIG. 7 is a diagram for explaining wavelength continuity constraints, and illustrates optical signals of respective wavelengths in S, C, and L bands, which are distinct wavelength bands, to be transmitted among a plurality of nodes.

For example, assume that, as illustrated in FIG. 7, wavelengths S1, S2, and S3 of S band, wavelengths C1, C2, and C3 of C band, and wavelengths L1, L2, and L3 of L band are set in nodes 40a . . . 40d, in the segments other than the segments indicated by the five elliptical dashed-line frames. In this case, in the case of the conventional technique, as the same wavelength of the same path collides in the wavelength-unused segments indicated by the elliptical dashed-line frames, the wavelength cannot be used due to the wavelength continuity constraint. For example, in the wavelength-unused segment indicated by the elliptical dashed-line frame in C band between nodes 40a and 40b, as wavelength C2 is already set between nodes 40b and 40d, the same wavelength C2 colliding with this cannot be set.

In this embodiment, however, as wavelength band conversion can be performed on a wavelength basis by wavelength cross connect device 10, it is possible to set wavelength C2 shown in the elliptical dashed-line frame in C band between nodes 40*a* and 40*b*. Further, it is possible to set wavelength S2 shown in the elliptical dashed-line frame in S band between nodes 40*b* and 40*c*, and set wavelength L2 shown in the elliptical dashed-line frame in L band between nodes 40*c* and 40*d*. In this case, it is possible to transmit an optical signal between nodes 40*a* and 40*b* using wavelength C2 in wavelength band C, between nodes 40*b* and 40*c* using wavelength S2 in wavelength band S, and between nodes 40*c* and 40*d* using wavelength L2 in wavelength band L.

In this way, an optical signal can be transmitted using the unused wavelengths indicated in the elliptical dashed-line frames so that wavelength collisions is avoidable. This makes it possible to increase the use capacity of the network. That is, the efficiency of utilizing the network in the multi-band transmission system can be increased.

Further, by such a conversion for each wavelength in a wavelength band, it is possible to mitigate the capacity constraint due to inter-band stimulated Raman scattering that occurs in S band.

Example 1 of Path Setting

Figure 8:
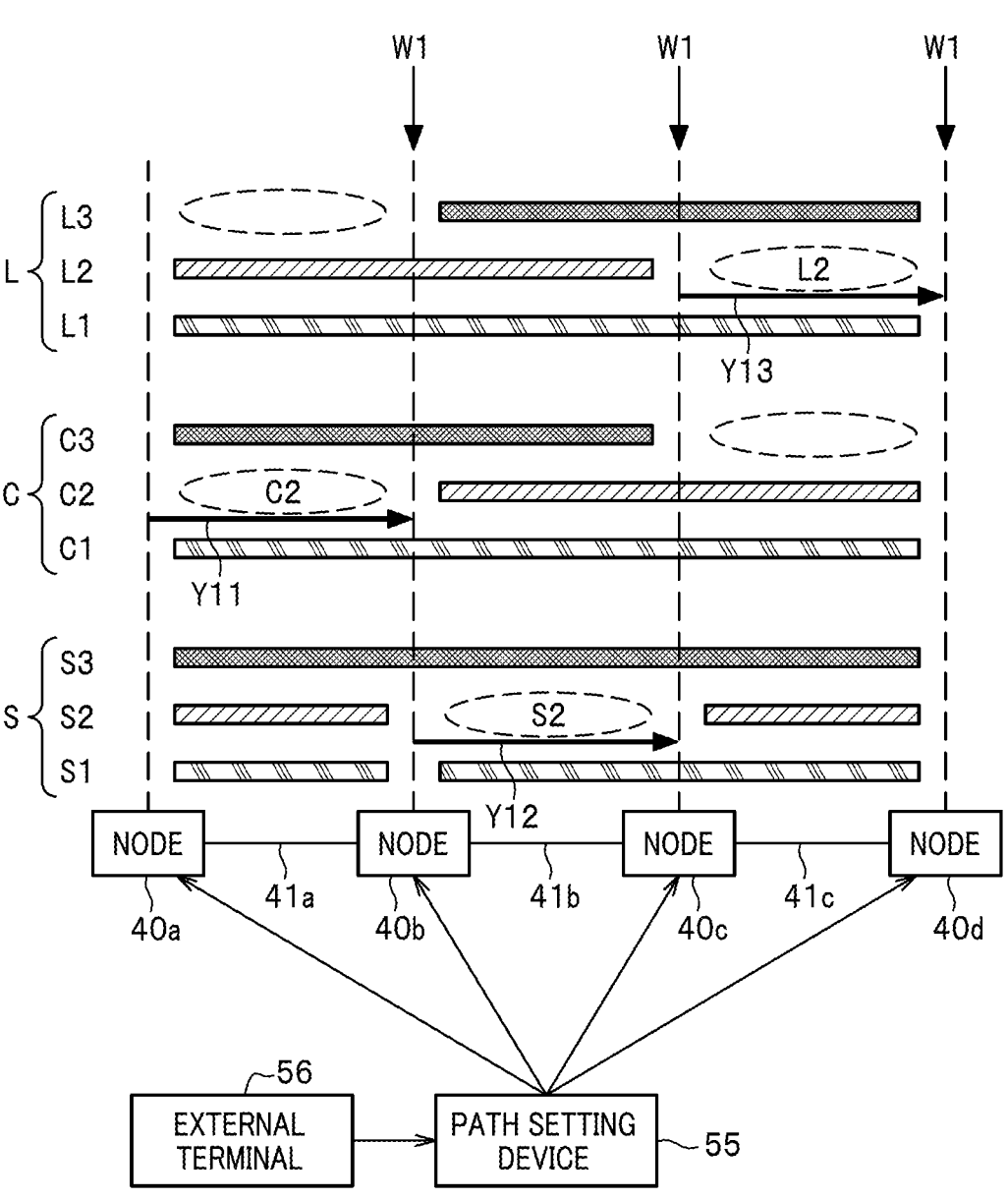
FIG. 8 is an explanatory diagram of Example 1 of path setting.

Here, Example 1 of path setting will be described with reference to FIG. 8.

Path setting device 55 is connected to each of nodes 40*a* to 40*d*. External terminal 56 such as a personal computer that issues path setting orders is connected to path setting device 55. The plurality of arrows W1 indicates wavelength band switching points.

Path setting device 55 manages the wavelength usage status among nodes 40*a* . . . 40*d*. For example, in a case where an order for setting a path in nodes 40*a* . . . 40*d* is newly added by external terminal 56, as it is not possible to set the path through nodes 40*a* . . . 40*d* using the same wavelength, path setting device 55 checks the status of unused wavelengths.

Path setting device 55 issues the instructions described in the following (1) to (4), based on the checking of the status of the unused wavelengths.

(1) To set an optical path in optical transmission line 41*a*, path setting device 55 instructs node 40*a* to transmit wavelength C2 of C band to node 40*b* as indicated by arrow Y11.

(2) To set an optical path in optical transmission line 41*b*, path setting device 55 instructs node 40*b* to switch C band of the input optical signal of wavelength C2 to S band, convert the optical signal into an optical signal of wavelength S2, and transmit the converted optical signal to node 40*c* as indicated by arrow Y12.

(3) To set an optical path in optical transmission line 41*c*, path setting device 55 instructs node 40*c* to switch S band of the input optical signal of wavelength S2 to the L band, convert the optical signal into an optical signal of wavelength L2, and transmit the converted optical signal to node 40*d* as indicated by arrow Y13.

(4) Path setting device 55 may instruct, to node 40*d*, restoration to wavelength S2 of S band. This is performed in a case where the available wavelength bands at the start point and the end point of the path have been determined.

Figure 9:
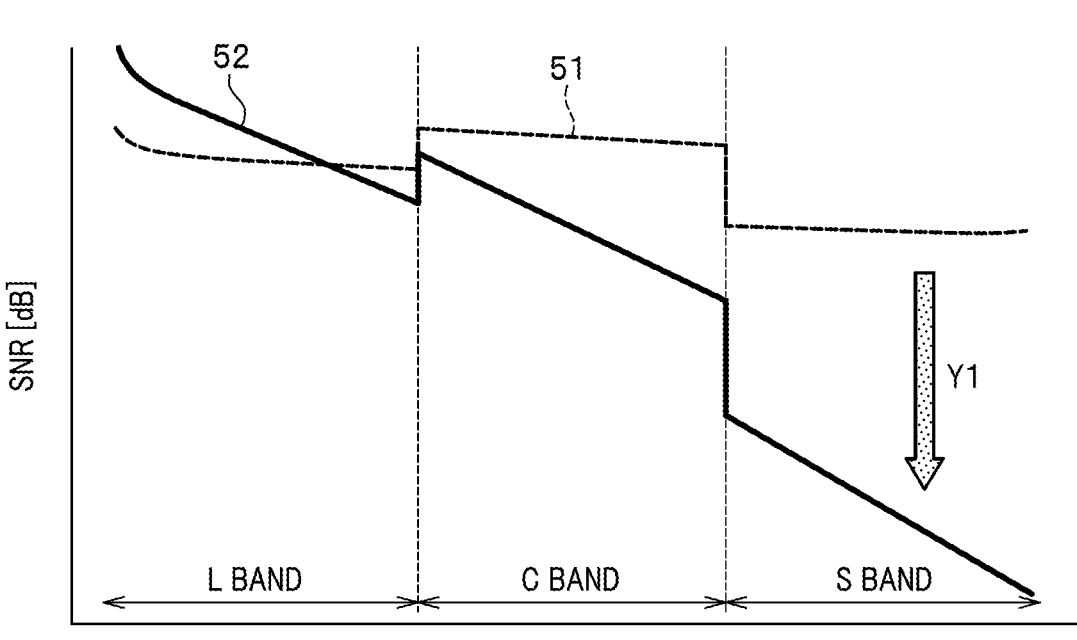
FIG. 9 is a graph illustrating the optical signal-to-noise ratios (SNRs) in S, C, and L bands.

Next, as illustrated in FIG. 9, in a case where no inter-band stimulated Raman scattering occurs in S, C, and L bands, the optical signal-to-noise ratios (SNRs [dB] on the ordinate axis) in S, C, and L bands are substantially the same as indicated by the dashed line 51.

Figure 10:
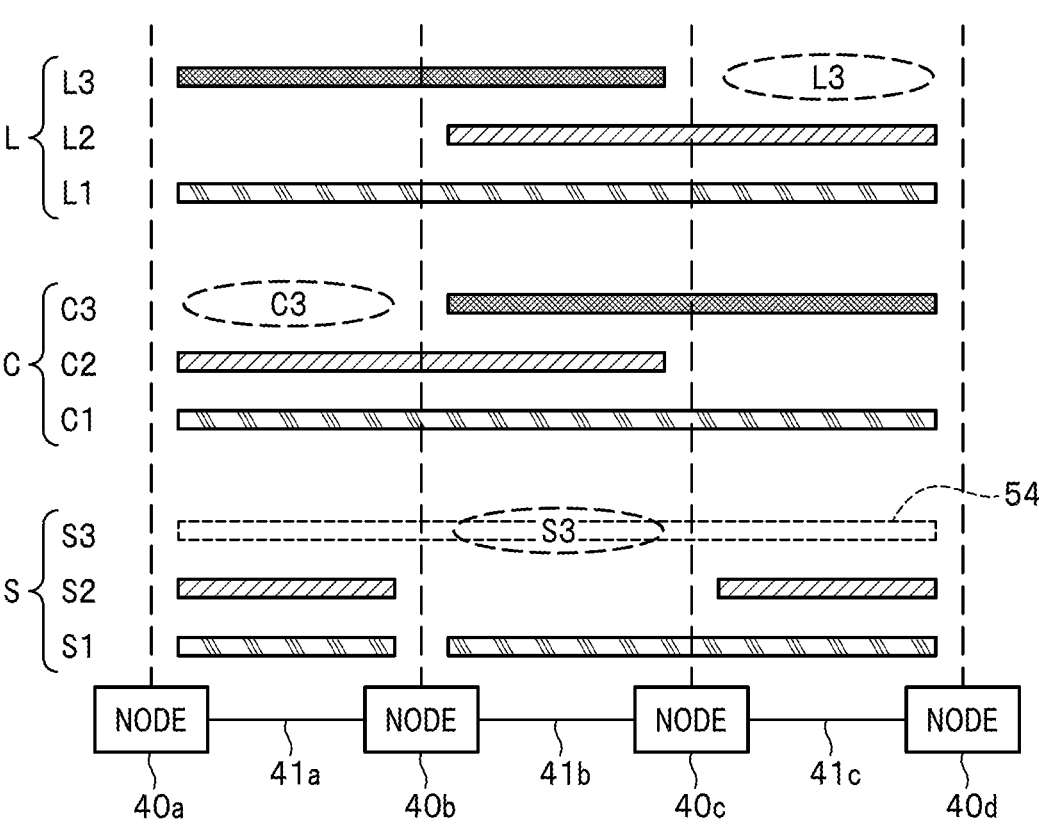
FIG. 10 is a diagram for explaining the capacity constraints due to inter-band stimulated Raman scattering, and illustrates optical signals of the respective wavelengths of S, C, and L bands, which are distinct wavelength bands to be transmitted among a plurality of nodes.

On the other hand, in a case where inter-band stimulated Raman scattering occurs, the SNRs in S, C, and L bands become lower as the frequency in the wavelength becomes higher, or, in other words, as the wavelength in the wavelength bands becomes shorter, as indicated by the solid line 52. The SNR is worst in S band. Therefore, as indicated by the dashed-line horizontal bar denoted by reference numeral 54 in FIG. 10, optical signal transmission via S band cannot be performed through nodes 40*a*-40*b*-40*c*-40*d*.

However, as this embodiment makes it possible to perform wavelength band conversion on a wavelength basis by wavelength cross connect device 10, and accordingly, wavelengths of distinct wavelength bands are to be set in the wavelength-unused segments indicated by the elliptical dashed-line frames as follows. That is, wavelength C3 is set between nodes 40*a* and 40*b*, wavelength S3 is set between nodes 40*b* and 40*c*, and wavelength L3 is set between nodes 40*c* and 40*d*. With this setting, the optical signal can be transmitted between nodes 40*a* and 40*b* using wavelength C3 in wavelength band C, between nodes 40*b* and 40*c* using wavelength S3 in wavelength band S, and between nodes 40*c* and 40*d* using wavelength L3 in wavelength band L, while reducing the influence of the inter-band stimulated Raman scattering.

Example 2 of Path Setting

Figure 11:
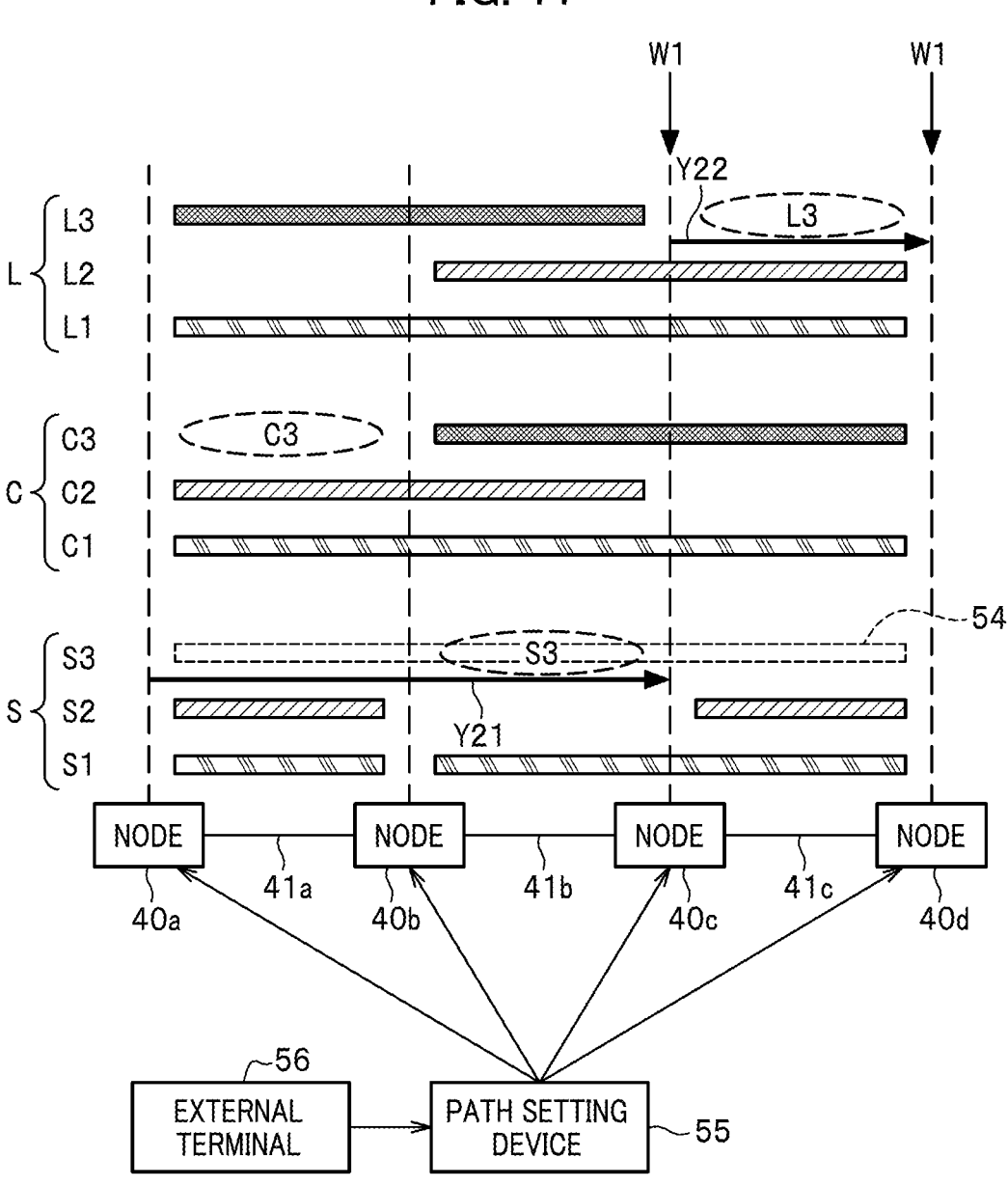
FIG. 11 is an explanatory diagram of Example 2 of path setting.

Here, Example 2 of path setting will be described with reference to FIG. 11. Note that path setting device 55 to which external terminal 56 is connected is connected to each of nodes 40*a* to 40*d*, as in the example illustrated in FIG. 8.

Path setting device 55 manages the wavelength usage status among nodes 40*a* . . . 40*d*. For example, in a case where an order for setting a path through nodes 40*a* . . . 40*d* is newly added by external terminal 56, path setting device 55 checks the status of the unused wavelengths. In the case of the example illustrated in FIG. 11, it is possible to set a path through nodes 40*a* to 40*d* at wavelength S3. However, in a case where it is specified as a setting condition that wavelength S3 can be set for up to two consecutive links, for example, it is not possible to set any path at wavelength S3 to optical transmission lines 41*a*, 41*b*, and 41*c*.

Path setting device 55 then issues the instructions described in the following (1) to (4), based on the checking of the status of unused wavelengths.

(1) To set an optical path in optical transmission line 41*a*, path setting device 55 instructs node 40*a* to transmit an optical signal of wavelength S3 of S band to node 40*b* as indicated by arrow Y21.

(2) To set an optical path in optical transmission line 41*b*, path setting device 55 instructs node 40*b* to transmit the input optical signal of wavelength S3 as is to node 40*c* as indicated by arrow Y21.

(3) To set an optical path in optical transmission line 41*c*, path setting device 55 instructs node 40*c* to switch S band of the input optical signal of wavelength S3 to L band, converting the optical signal into an optical signal of wavelength L3, and transmit the optical signal to node 40*d*, as indicated by arrow Y22.

(4) Path setting device 55 may instruct, to node 40*d*, restoration to wavelength S2 of S band. This is performed in a case where the available wavelength bands at the start point and the end point of the path have been determined.

As described above, as it is possible to transmit an optical signal through nodes 40a . . . 40d while mitigating the influence due to the inter-band stimulated Raman scattering, it is also possible to mitigate the capacity constraint due to the inter-band stimulated Raman scattering. Accordingly, it is possible to increase the use capacity of the network in the multi-band transmission system and increase the efficiency of utilizing the network.

That is, in general, the network efficiency drops from 100% due to the wavelength continuity constraint, and further drops due to the capacity constraint due to the influence caused by inter-band stimulated Raman scattering. However, with wavelength cross connect device 10 of this embodiment, it is possible to reduce the decrease in the network efficiency.

(2a) Wavelength band switching unit 30 includes <Mx1> WSS 25a as a first WSS configured to sequentially perform selection, one by one, on the plurality of wavelength multiplexed signal beams from input-side WSSes 21a to 21m and outputs the selected wavelength multiplexed signal beam. In addition, wavelength band switching unit 30 includes wavelength band switch processing unit 26a configured to output a wavelength multiplexed signal beam in which the wavelength bands multiplexed in the wavelength multiplexed signal beam output from <Mx1> WSS 25a have been converted into different wavelength bands. Further, wavelength band switching unit 30 includes <1xM> WSS 27a as the second WSS configured to split the wavelength multiplexed signal beam output from wavelength band switch processing unit 26a and inputs the split wavelength multiplexed signal beams to output-side WSSes 22a to 22m so as to be rerouted.

The above-described <Mx1> WSS 25a, wavelength band switch processing unit 26a, and <1xM> WSS 27a are included as a constituent set. The constituent set is configured such that the constituent set can be provided as many as the number of the wavelength multiplexed signal beams in which optical signals for which wavelength band conversion is necessary are multiplexed among the N-split wavelength multiplexed signal beams of input-side WSSes 21a to 21m.

With this configuration, in a case where the amount of communication of the wavelength multiplexed signal beams to be transmitted in multiple bands increases and it is desirable to increase the number of wavelength band switches in wavelength band switching unit 30, the number of wavelength band switches can be increased in units of constituent set, and accordingly, can be easily increased.

(3a) Wavelength band switch processing units 26a and 26b each include wavelength band demultiplexer 31, wavelength band converters 32 and 33 serving as input-side converters, <KxK> WSS 34 serving as the specific WSS, wavelength band converters 35 and 36 serving as output-side converters, and wavelength band multiplexer 37.

Wavelength band demultiplexer 31 demultiplexes and outputs optical signals of distinct wavelength bands multiplexed in the wavelength multiplexed signal beams output from <Mx1> WSSes 25a and 25b serving as the first WSS on the input side.

Wavelength band converters 32 and 33 serving as input-side converters convert, of the optical signals of distinct wavelength bands demultiplexed by wavelength band demultiplexer 31, an optical signal of a wavelength band other than a predetermined specific wavelength band into an optical signal of the specific wavelength band.

<KxK> WSS 34 has the same number of input ports and the same number of output ports as the number of signals demultiplexed by wavelength band demultiplexer 31, is capable of processing only the specific wavelength band, and outputs, from the output ports, the specific wavelength band having been converted by wavelength band converters 32 and 33 and input from the input ports or the specific wavelength band among the above-described demultiplexed distinct wavelength bands, so as to be converted into predetermined wavelength band.

Wavelength band converters 35 and 36 serving as output-side converters convert the optical signals of the specific wavelength band output from the output ports into optical signals of predetermined wavelength bands.

Wavelength band multiplexer 37 combines the optical signals of distinct wavelength bands output from wavelength band converters 35 and 36 to convert the optical signals into a wavelength multiplexed signal beam, and outputs the converted wavelength multiplexed signal beam to a corresponding one of <1xM> WSSes 27a and 27b serving as the second WSS.

With this configuration, <KxK> WSS 34 outputs, from the output ports, the specific wavelength band converted by the input-side wavelength band converters 32 and 33 or the specific wavelength band among the distinct wavelength bands demultiplexed by wavelength band demultiplexer 31, so as to be converted into predetermined wavelength bands. As it is possible to convert the respective optical signals of the distinct wavelength bands into optical signals of predetermined wavelength bands using the single <KxK> WSS 34 as described above, wavelength band switch processing units 26a and 26b can be reduced in size.

Another Configuration of Wavelength Band Switch Processing Unit

Figure 12:
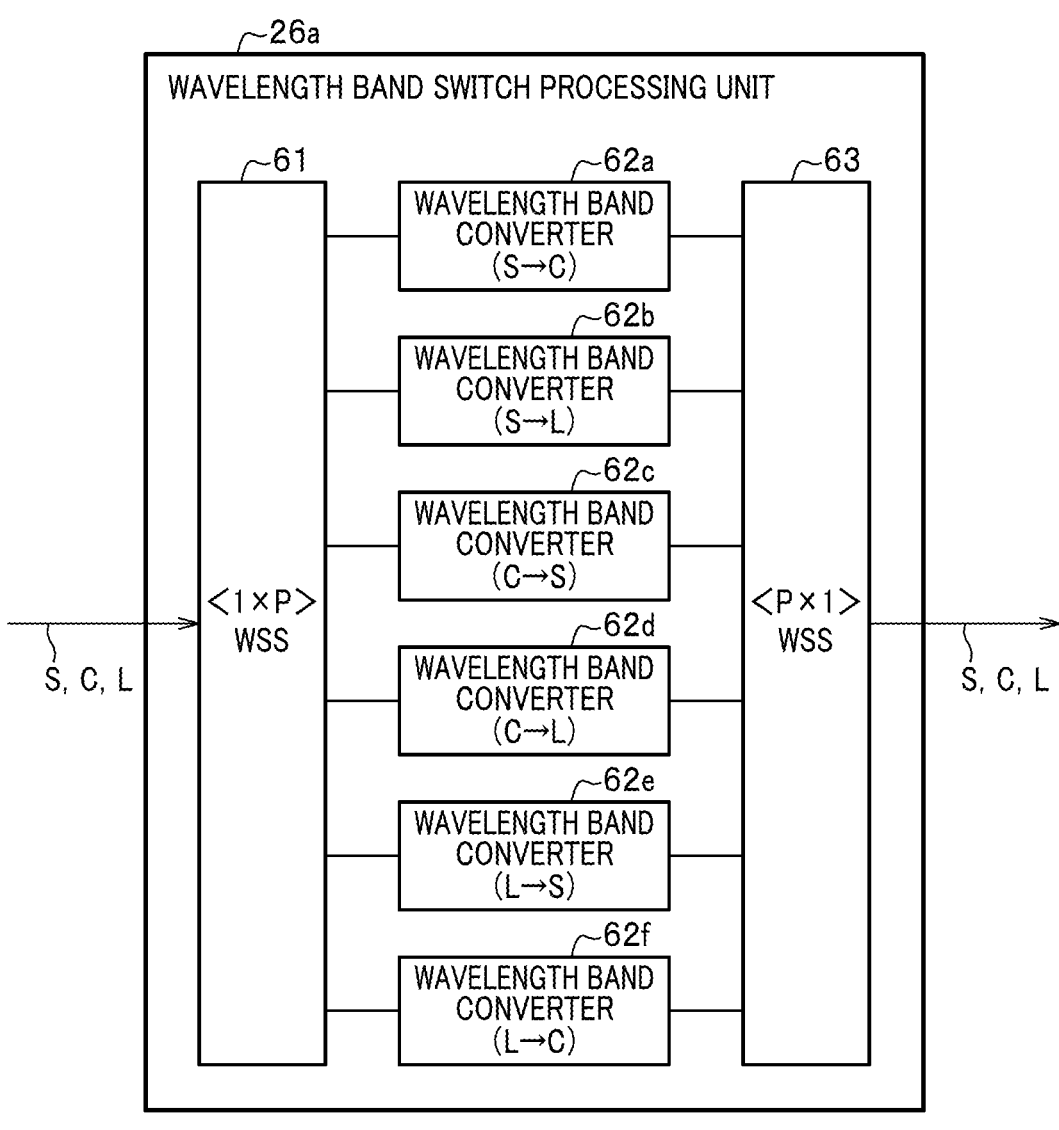
FIG. 12 is a block diagram illustrating another configuration of a wavelength band switch processing unit of the wavelength cross connect device according to the embodiment.

Other than the configuration illustrated in FIG. 2, wavelength band switch processing units 26a and 26b may be configured as illustrated in FIG. 12, in which wavelength band switch processing unit 26a is shown as a representative.

Wavelength band switch processing unit 26a illustrated in FIG. 12 includes <1xP> WSS 61, P wavelength band converters 62a, 62b, 62c, 62d, 62e, and 62f, and <Px1> WSS 63. P is the same number as the number of the output ports of <1xP> WSS 61, the number of the input ports of <Px1> WSS 63, and the number of wavelength band converters 62a to 62f.

Here, either <1xP> WSS 61 or <Px1> WSS 63 may be an optical coupler such as a 1xP or Px1 optical fiber coupler. Note that <1xP> WSS 61 forms the third WSS described in the claims. <Px1> WSS 63 forms the fourth WSS described in the claims.

<1xP> WSS 61 P-splits the S-, C-, and L-band optical signals of distinct wavelength bands multiplexed in the wavelength multiplexed signal beam input from <Mx1> WSS 25a (FIG. 1). This P-splitting is performed including a predetermined number of optical signals in the same wavelength band. In this example, the P-splitting is performed including two optical signals of S band, two optical signals of C band, and two optical signals of L band, as follows. That is, the S-band optical signal is output to the wavelength band converters 62a and 62b, the C-band optical signal is output to the wavelength band converters 62c and 62d, and the L-band optical signal is output to the wavelength band converters 62e and 62f.

Wavelength band converter 62a converts S band into a C-band optical signal, wavelength band converter 62b converts S band into an L-band optical signal, and the converted optical signals are output to input ports of <P×1> WSS 63. Wavelength band converter 62c converts C band into an S-band optical signal, wavelength band converter 62d converts C band into an L-band optical signal, and the converted optical signals are output to input ports of <P×1> WSS 63. Wavelength band converter 62e converts L band into an S-band optical signal, wavelength band converter 62f converts L band into a C-band optical signal, and the converted optical signals are output to input ports of <P×1> WSS 63.

<P×1> WSS 63 multiplexes the S, C, and L bands each of which is input in two to the P input ports and outputs the wavelength multiplexed signal beam to <1×M> WSS 27a illustrated in FIG. 1.

With this configuration, wavelength band switch processing units 26a and 26b with a simple configuration can convert distinct wavelength bands multiplexed in a wavelength multiplexed signal beam output from WXC unit 20 into optical signals of other distinct wavelength bands.

Other than the above, wavelength band switch processing unit 26a illustrated in FIG. 2 or FIG. 12 may use a WSS that can handle at least two wavelength bands. For example, instead of WSS 34 capable of processing S, C, and L bands as illustrated in FIG. 2, a WSS for S band and a WSS for C band and L band may be used as one set. Further, in a case where E, S, C, and L bands are used, a WSS for E-band and S band and a WSS for C band and L band may be used. That is, each WSS may be configured to be capable of processing half the four wavelength bands.

Effects (1) A wavelength cross connect device configured to: split each of wavelength multiplexed signal beams, in each of which optical signals of distinct wavelength bands are multiplexed and each of which is transmitted in multiple bands in a respective one of M optical transmission lines each including one or a plurality of optical fibers, into N wavelength multiplexed signal beams using M input-side Wavelength Selective Switches (WSSes), where N is a number larger than M; and perform relay processing by which the N-split wavelength multiplexed signal beams are rerouted and output via M output-side WSSes mesh-connected to the input-side WSS, the wavelength cross connect device including: a wavelength cross connect (WXC) unit including the input-side WSSes and the output-side WSSes, wherein, of the wavelength multiplexed signal beams N-split by each of the input-side WSSes, wavelength multiplexed signal beams in which optical signals for which wavelength band conversion is not necessary are multiplexed are input to the output-side WSSes; and a wavelength band switching unit configured to convert, from the wavelength multiplexed signal beams N-split by each of the input-side WSSes, wavelength bands of a wavelength multiplexed signal beam in which optical signals for which wavelength band conversion is necessary are multiplexed to different wavelength bands, reroute the converted wavelength multiplexed signal beam, and output the rerouted wavelength multiplexed signal beam to the output-side WSSes.

According to this configuration, the wavelength cross connect device causes the input-side WSSes of the WXC unit to N-split wavelength multiplexed signal beams, in each of which optical signals of distinct wavelength bands are multiplexed and each of which is transmitted in multiple bands. Of the N-split wavelength multiplexed signal beams, wavelength bands of wavelength multiplexed signal beams in which optical signals for which wavelength band conversion is necessary are multiplexed are, by the wavelength band switching unit, converted to different wavelength bands, rerouted, and output to output-side routes via the output-side WSSes.

Accordingly, in a multi-band transmission system, in which a plurality of nodes to which the wavelength cross connect device is applied are linked to one another (connected via optical transmission lines), wavelength band conversion can be performed on a link basis and on a wavelength basis. By this conversion, the wavelength (e.g., wavelength C1 of C band) of a vacant wavelength band of an optical transmission line of a segment between nodes can be used by conversion by the wavelength cross connect device located on the forward side of the segment between the nodes. In this manner, as a wavelength of a wavelength band of a wavelength-unused segment can be made usable, the use capacity of the network can be increased. That is, the efficiency of utilizing the network in the multi-band transmission system can be increased.

(2) In the wavelength cross connect device of (1), the wavelength band switching unit includes, as a constituent set: a first WSS configured to sequentially perform selection, one by one, on the plurality of wavelength multiplexed signal beams from the input-side WSSes and output a selected wavelength multiplexed signal beam, a wavelength band switch processing unit configured to output a wavelength multiplexed signal beam in which the wavelength bands multiplexed in the wavelength multiplexed signal beam from the first WSS have been converted into different wavelength bands, and a second WSS configured to split the wavelength multiplexed signal beam from the wavelength band switch processing unit and input the split wavelength multiplexed signal beams to the output-side WSSes so as to be rerouted, wherein the wavelength band switching unit includes a same number of the constituent sets as the number of the wavelength multiplexed signal beams in which optical signals for which wavelength band conversion is necessary are multiplexed among the N-split wavelength multiplexed signal beams of each of the input-side WSSes.

With this configuration, in a case where the amount of communication of the wavelength multiplexed signal beams to be transmitted in multiple bands increases and it is desirable to increase the number of wavelength band switches in the wavelength band switching unit, the number of wavelength band switches can be increased in units of the constituent set, and accordingly, can be easily increased.

(3) In the wavelength cross connect device of (2), the wavelength band switch processing unit includes: a wavelength band demultiplexer configured to demultiplex and output the optical signals of the distinct wavelength bands multiplexed in the wavelength multiplexed signal beam output from the first WSS; an input-side converter configured to convert, of the demultiplexed optical signals of distinct wavelength bands, an optical signal of a wavelength band other than a predetermined specific wavelength band into an optical signal of the specific wavelength band; a specific WSS having a same number of input ports and a same number of output ports as a number of the demultiplexed optical signals, specific WSS being capable of processing only the specific wavelength band and configured to output, from the output ports, the specific wavelength band having been converted by the input-side converter and input from the input ports or the specific wavelength band among the demultiplexed distinct wavelength bands, so as to be converted into a predetermined wavelength band; an output-side converter configured to convert an optical signal of the specific wavelength band output from the output ports into an optical signal of a predetermined wavelength band; and a wavelength band multiplexer configured to combine the optical signals of the distinct wavelength bands from the output-side converter to convert them into a wavelength multiplexed signal beam and output the converted wavelength multiplexed signal beam to the second WSS.

With this configuration, the specific WSS outputs, from the output ports, the specific wavelength band converted by the input-side converter or the specific wavelength band among the distinct wavelength bands demultiplexed by the wavelength band demultiplexer, so as to be converted into predetermined wavelength bands. As the optical signals of respective distinct wavelength bands can be converted into optical signals of predetermined wavelength bands using the single specific WSS as described above, the wavelength band switch processing units can be reduced in size.

(4) In the wavelength cross connect device of (2), the wavelength band switch processing unit includes: a third WSS configured to split the distinct wavelength bands multiplexed in the wavelength multiplexed signal beam output from the first WSS, resulting in optical signals including a predetermined number of optical signals of a same wavelength band; a same number of wavelength band converters as a number of the split optical signals, the wavelength band converters configured to convert the optical signals of the wavelength bands split by the third WSS into optical signals of different wavelength bands; and a fourth WSS configured to multiplex the optical signals of the respective wavelength bands converted by the wavelength band converters to convert them into a wavelength multiplexed signal beam, and outputs the converted wavelength multiplexed signal beam to the second WSS.

With this configuration, the wavelength band switch processing unit with a simple configuration can convert the distinct wavelength bands multiplexed in the wavelength multiplexed signal beam output from the WXC unit into optical signals of other distinct wavelength bands.

In addition to the above, the specific configurations can be modified as appropriate, without departing from the scope of the present invention.

REFERENCE SIGNS LIST

10 Wavelength cross connect device
20 WXC unit
21a to 21m <1×N> WSS (input-side WSS)
22a to 22m <N×1> WSS (output-side WSS)
30 Wavelength band switching unit
25a, 25b <M×1> WSS (first WSS)
26a, 26b Wavelength band switch processing unit
27a, 27b <1×M> WSS (second WSS)
31 Wavelength band demultiplexer
32, 33 Wavelength band converter (input-side converter)
34 <K×K> WSS (specific WSS)
35, 36 Wavelength band converter (output-side converter)
37 Wavelength band multiplexer 61 <1×P> WSS (third WSS)
62a to 62f Wavelength band converter
63 <P×1> WSS (fourth WSS)

The invention claimed is:

1. A wavelength cross connect device comprising:
a wavelength cross connect (WXC) unit comprising M input-side WSSes and M output-side WSSes mesh-connected to the M input-side WSSes; and
a wavelength band switching unit,
wherein the WXC unit is configured to receive M wavelength multiplexed signal beams, in each of which optical signals of distinct wavelength bands are multiplexed and each of which is transmitted in multiple bands in a respective one of M optical transmission lines each including one or a plurality of optical fibers,
wherein each of the M input-side WSSes is configured to:
receive a respective one of the M wavelength multiplexed signal beams,
split the received wavelength multiplexed signal beam into N wavelength multiplexed signal beams, where N is a number larger than M;
input, of the N wavelength multiplexed signal beams, wavelength multiplexed signal beams in each of which optical signals for which wavelength band conversion is not necessary are multiplexed to the M output-side WSSes mesh-connected to the input-side WSS, respectively; and
input, of the N wavelength multiplexed signal beams, wavelength multiplexed signal beams in each of which optical signals for which the wavelength band conversion is necessary are multiplexed to the wavelength band switching unit, and
wherein the wavelength band switching unit is configured to:
perform the wavelength band conversion on each of the wavelength multiplexed signal beams input from the M input-side WSSes, each to generate a wavelength-band-converted wavelength multiplexed signal beam in which the wavelength bands of the optical signals of the distinct wavelength bands multiplexed in the wavelength multiplexed signal beam input from the M input-side WSSes have been converted to different wavelength bands, the different wavelength bands being all selected from among the distinct wavelength bands, and
output the wavelength-band-converted wavelength multiplexed signal beam to the M output-side WSSes so as to be able to be rerouted.

2. The wavelength cross connect device according to claim 1,
wherein the wavelength band switching unit comprises, as a constituent set:
a first WSS configured to receive second M wavelength multiplexed signal beams each of which is one of the wavelength multiplexed signal beams input from the M input-side WSSes and select and output a wavelength multiplexed signal beam selected from the second M wavelength multiplexed signal beams;
a wavelength band switch processing unit configured to generate, from the wavelength multiplexed signal beam output by the first WSS, a wavelength-band-converted wavelength multiplexed signal beam in which wavelength bands of optical signals multiplexed in the wavelength multiplexed signal beam output by the first WSS have been converted to different wavelength bands; and a second WSS configured to split the wavelength-band-converted wavelength multiplexed signal beam generated by the wavelength band switch processing unit and input the split wavelength-band-converted wavelength multiplexed signal beams to the M output-side WSSes so that the wavelength-band-converted wavelength multiplexed signal beam is able to be rerouted, and wherein the wavelength band switching unit comprises a same number of the constituent sets as the number of the wavelength multiplexed signal beams in which optical signals for which wavelength band conversion is necessary are multiplexed among the N-split wavelength multiplexed signal beams of each of the input-side WSSes.

3. The wavelength cross connect device according to claim 2, wherein the wavelength band switch processing unit comprises:

a wavelength band demultiplexer;

input-side converters;

a specific WSS;

output-side converters; and a wavelength band multiplexer, wherein the wavelength band demultiplexer is configured to demultiplex optical signals of distinct wavelength bands multiplexed in the wavelength multiplexed signal beam output from the first WSS, to generate demultiplexed optical signals of the distinct wavelength bands, wherein the input-side converters are each configured to convert, of the demultiplexed optical signals of the distinct wavelength bands, a respective optical signal of a wavelength band other than a predetermined specific wavelength band into an optical signal of the specific wavelength band, wherein the specific WSS has a same number of input ports and a same number of output ports as a number the demultiplexed optical signals of the distinct wavelength bands and is configured to:

receive, through the input ports, the optical signals of the specific wavelength band having been converted by the input-side converters and an optical signal of the specific wavelength band among the demultiplexed optical signals of the distinct wavelength bands, and switch and output, from the output ports, the received optical signals of the specific wavelength bands so that a wavelength band of each of the demultiplexed optical signals of the distinct wavelength bands is converted to a predetermined wavelength band as a result of processing by the input-side converters, the specific WSS, and the output-side converters, wherein the output-side converters are each configured to convert the optical signal of the specific wavelength band output from a corresponding one of the output ports into an optical signal of a predetermined wavelength band, and wherein the wavelength band multiplexer is configured to:

combine the optical signals converted by the output-side converters and an optical signal output from a corresponding one of the output ports of the specific WSS to generate the wavelength-band-converted wavelength multiplexed signal beam; and output the generated wavelength-band-converted wavelength multiplexed signal beam to the second WSS.

4. The wavelength cross connect device according to claim 2, wherein the wavelength band switch processing unit comprises:

a third WSS configured to demultiplex optical signals of distinct wavelength bands multiplexed in the wavelength multiplexed signal beam output from the first WSS into a predetermined number of optical signals each including the optical signal of any one of the distinct bands solely such that the demultiplexed predetermined number of optical signals includes a predetermined number of optical signals of a same wavelength band;

a plurality of wavelength band converters, a number of which being the same as a number of the demultiplexed predetermined number of optical signals, each configured to convert a corresponding one of the optical signals of the distinct wavelength bands demultiplexed by the third WSS into an optical signal of a different wavelength band; and a fourth WSS configured to perform wavelength band multiplex processing to generate the wavelength-band-converted wavelength multiplexed signal beam from the optical signals of the distinct wavelength bands converted by the plurality of wavelength band converters, and output the generated wavelength-band-converted wavelength multiplexed signal beam to the second WSS.

5. A wavelength cross connect method to be performed by a wavelength cross connect device, the wavelength cross connect device configured to: split each of wavelength multiplexed signal beams, in each of which optical signals of distinct wavelength bands are multiplexed and each of which is transmitted in multiple bands in a respective one of M optical transmission lines each including one or a plurality of optical fibers, into N wavelength multiplexed signal beams using M input-side Wavelength Selective Switches (WSSes), where N is a number larger than M; and perform relay processing by which the N-split wavelength multiplexed signal beams are rerouted and output via M output-side WSSes mesh-connected to the input-side WSS, the wavelength cross connect device configured to perform steps comprising:

outputting, of the wavelength multiplexed signal beams N-split by each of the input-side WSSes, a wavelength multiplexed signal beam in which optical signals for which wavelength band conversion is not necessary are multiplexed to the output-side WSSes, and converting, from the wavelength multiplexed signal beams N-split by each of the input-side WSSes, wavelength bands of a wavelength multiplexed signal beam in which optical signals for which wavelength band conversion is necessary are multiplexed to different wavelength bands, the different wavelength bands being all selected from among the distinct wavelength bands, rerouting the converted wavelength multiplexed signal beam, and outputting the rerouted wavelength multiplexed signal beam to the output-side WSSes.

* * * * *